(12) United States Patent
Beale

(10) Patent No.: US 6,438,155 B1
(45) Date of Patent: Aug. 20, 2002

(54) DECODING CHIP STREAMS

(75) Inventor: Martin Warwick Beale, Glossop (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/352,826

(22) Filed: Jul. 13, 1999

(30) Foreign Application Priority Data

Jul. 13, 1998 (EP) .............................. 98305567

(51) Int. Cl.$^7$ ................................. A04K 7/00
(52) U.S. Cl. ....................................... 375/130
(58) Field of Search ................. 375/130, 136, 375/137, 140, 142, 143, 145, 147, 149, 150, 367, 355; 370/503, 515

(56) References Cited

U.S. PATENT DOCUMENTS

| | | | |
|---|---|---|---|
| 4,930,139 A | 5/1990 | Chandler et al. | |
| 5,077,753 A | 12/1991 | Grau, Jr. et al. | |
| 5,093,841 A | 3/1992 | Vancraeynest | |
| 5,319,735 A | 6/1994 | Preuss et al. | |
| 5,692,006 A | * 11/1997 | Ross ........................... | 375/130 |
| 5,920,555 A | * 7/1999 | Hulbert ....................... | 370/342 |
| 6,014,405 A | * 1/2000 | Garodnick et al. ......... | 375/130 |

FOREIGN PATENT DOCUMENTS

| EP | 0 400 314 A2 | 12/1990 |
|---|---|---|
| WO | WO 97/08861 | 3/1997 |

OTHER PUBLICATIONS

Chien, et al, "A single–Chip 12.7 Mchips/s Digital IF BPSK Direct Sequence Spread–Spectrum Transceiver in 1.2 $\mu$m CMOS," *8107 IEEE Journal of Solid–State Circuits*, Dec. 29, 1994, No. 12, New York, USA.

* cited by examiner

*Primary Examiner*—Jean Corrielus

(57) ABSTRACT

A method and apparatus are described for decoding a stream of data which has been encoded into a chip stream so that a chip rate and phase of the chip stream can be derived from the encoded data. The method comprises the steps of: generating a clock signal (clk) having a clock rate which is approximately equal to the chip rate or an integer multiple thereof; passing the chip stream along a multi-stage delay line (14); for each clock cycle, sampling data of the chip stream at a plurality of the stages of the delay line to produce a set of oversamples (oversamples); for each clock cycle, producing an estimate (edgepos) of a position in a respective set of the oversamples of a chip edge in the chip stream; for at least some of the clock cycles, selecting at least one of the oversamples (dec$_{13}$ chip(0), dec__chip(1)) having a position within a confined range with respect to the estimated chip edge position; and outputting the selected oversamples. The method obviates the need for a high frequency oversampling clock or a variable frequency clock. The delay per stage of the delay line does not need to be stabilised if a calibration method is employed periodically between reception sessions.

11 Claims, 4 Drawing Sheets

DECODING CHIP STREAMS

TECHNICAL FIELD

This invention is concerned with streams of data which have been encoded into a chip stream so that a chip rate and phase of the chip stream can be derived from the encoded data, and in particular the invention relates to a method of and an apparatus for decoding such chip streams.

BACKGROUND ART

There are many communications systems in which data is transmitted between a transmitter and a receiver and in which the transmitter does not explicitly transmit a copy of its clock signal. The data is transmitted using a code which ensures that timing information is present in the transmitted data. Such coded data is referred to as a "chip stream". In such a system, the receiver needs to recover both the data and the timing information. This has been done in the past using a phase-locked loop (PLL).

A traditional digital PLL oversamples the received chip stream using a clock having a frequency which is an integer multiple of the transmitted chip rate. As the chip rate is increased (to provide faster communication) and/or as th multiplier of the oversampling clock is increased (to provide better the operation of the PLL), the frequency of the oversampling clock can become unmanageably high. Under these circumstances, an analogue, rather than digital, PLL might be used. However, in a system comprising an analogue receiver (or transceiver) section and a digital controller section, such an analogue PLL would either need to be integrated with the receiver (or transceiver) section, occupy a special analogue support IC, or be integrated into a mixed signal controller. All of these options are more costly than integrating the PLL into the digital controller.

The present invention is concerned with the above problems and in particular with recovering data and timing information in such a way that it can be performed in a digital controller without the need for an oversampling clock, i.e. a clock having a clock rate which is many times faster than the chip rate.

DISCLOSURE OF INVENTION

In accordance with a first aspect of the present invention, there is provided a method of decoding a stream of data which has been encoded into a chip stream so that a chip rate and phase of the chip stream can be derived from the encoded data, the method comprising decoding steps of: generating a clock signal having a clock rate which is approximately equal to the chip rate (or an integer multiple thereof); passing the chip stream along a multi-stage delay line; for each clock cycle, sampling data of the chip stream at a plurality of the stages of the delay line to produce a set of oversamples; for each clock cycle, producing an estimate of a position in a respective set of the oversamples of a chip edge in the chip stream; for at least some of the clock cycles, selecting at least one of the oversamples having a position within a confined range with respect to the estimated chip edge position; and outputting the selected oversamples. Although the clock rate may be chosen to be a small integer multiple of the approximate chip rate, there is no need for this in order to perform the method. By passing the chip stream through the delay line, oversamples are obtained without the need for an oversampling clock.

In a traditional PLL, the PLL operates to adjust the clock frequency, and therefore a variable frequency oscillator is required. A PLL action may be obtained in the present invention by adjusting the estimate of the position in the oversamples of the chip edge, thus obviating the need for a variable frequency oscillator. Indeed, in the present invention, the clock rate is preferably fixed. Also, for simplicity, each selected oversample preferably has a predetermined position with respect to the estimated chip edge position.

Although the delay per stage in the delay line may be fixed and stabilised, this adds to the complexity and cost of the receiver. In the present invention, the delay per stage of the delay line need not be stabilised. To take account of manufacturing tolerances and drift in the delay per stage, for example in dependence on time, voltage and temperature, the method preferably further includes the calibration steps of: passing a signal having a known period (for example the above-mentioned clock signal) into the delay line; sampling data of the known period signal at a plurality of stages of the delay line to produce a set of calibration oversamples; estimating from the sampled data an indication of the delay per stage of the delay line; and storing the delay per stage indication. The calibration steps are preferably performed intermittently and while the decoding steps are not being performed. For example the calibration steps may be performed at power-on, when the apparatus is transmitting, and when the communications link is being turned around. Then, when receiving, the step of selecting at least one of the oversamples preferably comprises the steps of: for each clock cycle, making a first selection of some of the oversamples in dependence upon the stored delay indication; for at least some of the clock cycles, making a second selection, from the first selection of the oversamples, of said at least one of the oversamples having a predetermined position with respect to the estimated chip edge position.

As mentioned above, a PLL action may be obtained in the present invention by adjusting the estimate of the position in the oversamples of the chip edge. More particularly, the step of producing the chip edge position estimate preferably comprises the steps of: storing a chip edge position estimate; for at least some of the clock cycles, detecting any deviation of the chip edge position from the stored chip edge position estimate; and in response to such a detected deviation, adjusting the stored chip edge position estimate. For simplicity, the stored chip edge position estimate may be limited to having a predetermined range of values. In this case, special steps may be taken if the chip edge position estimate is about to be adjusted so that it is outside the range. In particular, in a preferred embodiment of the invention, if, for a clock cycle, the value of the stored chip edge position estimate needs to be adjusted past one end of its range, it is instead adjusted to the other end of its range and none of the oversamples is selected for output; and if, for a clock cycle, the value of the stored chip edge position estimate needs to be adjusted past said other end of its range, it is instead adjusted to said one end of its range and two of the oversamples are selected for output.

In accordance with a second aspect of the present invention, there is provided an apparatus arranged to perform the method of the first aspect of the invention.

In accordance with a third aspect of the present invention, there is provided an apparatus for decoding a stream of data which has been encoded into a chip stream so that a chip rate and phase of the chip stream can be derived from the encoded data, the apparatus comprising: a clock for generating a clock signal having a clock rate which is approximately equal to the chip rate or an integer multiple thereof; a multi-stage delay line for receiving the chip stream; means clocked by the clock signal for sampling data of the chip stream at each stage of the delay line to produce a set of oversamples; means clocked by the clock signal for producing an estimate of a position in a respective set of the oversamples of a chip edge in the chip stream; means responsive to the clock signal for selecting, for at least some of the clock cycles, at least one of the oversamples having a position within a confined range with respect to the estimated chip edge position; and means for outputting the selected oversamples.

This apparatus is preferably operable to perform any one or more of the preferred features of the method of the first aspect of the invention.

BRIEF DESCRIPTION OF THE DRAWINGS

A specific embodiment of the present invention will now be described, purely by way of example, with reference to the accompanying drawings, in which.

BEST MODE FOR CARRYING OUT THE INVENTION,& INDUSTRIAL APPLICABILITY

Figure 1:
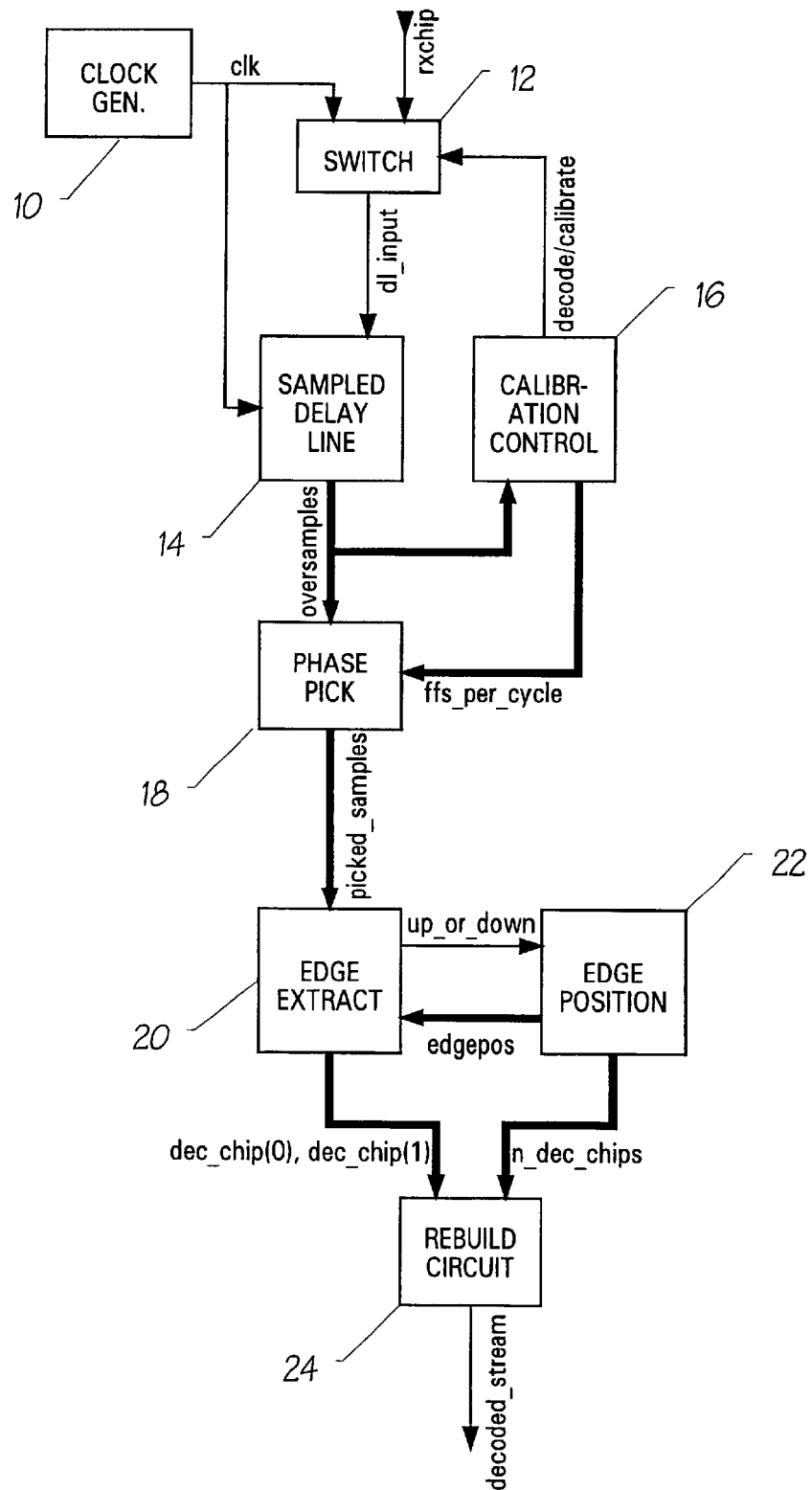
FIG. 1 is a block diagram of an apparatus embodying the invention.

An overview of the apparatus of FIG. 1 will firstly be given. The apparatus has two modes of operation: "decoding" and "calibration". The calibration mode is employed repeatedly when the apparatus is not receiving, for example at power-on, when the apparatus is transmitting, and when the communications link is being turned around. In the calibration mode, a square-wave clock signal clk from a clock generator 10 (or some other signal of known period) is passed by a switch 12, under control of a calibration control circuit 16, as a signal dl_input to a multi-stage sampled delay line circuit 14. The clk signal is also supplied as a clock input to the delay line circuit 14. Each stage of the delay line circuit 14 provides a delay which is shorter than the period of the clk signal, which can vary as between one circuit and another due to manufacturing tolerances, and which can drift with time, voltage and temperature. Each stage of the delay line circuit 14 is tapped to provide a respective element of an oversamples signal. The oversamples signal is fed to the calibration control circuit 16, which determines the number of stages of the delay line circuit 14 which together produce a delay generally equal to the period of the clk signal, and this number is stored as a signal ffs_per_cycle.

The decoding mode of the apparatus is employed when the apparatus is receiving. The apparatus receives a chip stream signal rxchip which has a chip rate approximately equal to the frequency of the clk signal. The chip stream signal rxchip is passed by the switch 12, under control of the calibration control circuit 16, as the dl_input signal to the delay line circuit 14. The delay line circuit 14 produces, with each cycle of the clk signal, an oversamples signal having a number of samples equal to the number of stages in the delay line circuit 14, and the oversamples signal is passed to a phase pick circuit 18, which also receives the previously calculated ffs_per_cycle signal from the calibration control circuit 16. With each cycle of the clk signal, the phase pick circuit 18 selects a predetermined number of samples of the oversamples signal spread as regularly as possible over the first ffs_per_cycle samples, beginning with the least delayed sample. The selected samples are passed as a signal picked_samples to an edge extract circuit 20, which stores that signal as current_picked_samples and also stores the immediately preceding signal as previous_picked_samples. The edge extract circuit 20 operates in cooperation with an edge position circuit 22 as a phase-locked loop. The edge position circuit 22 maintains a signal edgepos which is an estimate of the position within current_picked_samples and previous_picked_samples of a chip edge of the chip stream, and the edgepos signal is supplied to the edge extract circuit 20. The edge extract circuit 20 generates an estimate of whether the edge of the incoming chip occurs earlier or later than expected, as a function of current_picked_samples, previous_picked_samples and edgepos, and produces a corresponding up_or_down signal which is supplied to the edge position circuit 22. The edge position circuit 22 modifies the value of the edgepos signal in dependence upon the up_or_down signal. With each cycle of the clk signal, the edge extract circuit 20 selects two of the samples from the set current_picked_samples and previous_picked_samples and supplies them as dec_chip(0), dec_chip(1) to a rebuild circuit 24, the two selected samples dec_chip(0), dec_chip(1) being equally spaced by a predetermined amount to either side of the edgepos position within current_picked_samples and previous_picked_samples. Also, with each cycle of the clk signal, the edge position circuit 22 produces a signal n_dec_chips indicating whether or not each of the selected samples dec_chip(0), dec_chip(1) is to be used in decoding the chip stream, and supplies the signal n_dec_chips to the rebuild circuit 24. Furthermore, with each cycle of the clk signal, the rebuild circuit 24 selects none, one, the other, or both of the samples dec_chip(0), dec_chip(1) in dependence upon the value of n_dec_chips and includes it/them in an output signal decoded_stream, or serial-to-parallel converts the bits to produce a parallel output signal.

It should be noted that, if the chip rate of the rxchip signal were exactly equal to the frequency of the clk signal (and if the delay of each stage in the delay line 14 never varied), then in one reception session the value of the edgepos signal would remain constant, and with each cycle of the clk signal a sample at a constant position in the set current_picked_samples and previous_picked_samples would be selected for the output. However, the clk signal is not synchronised with the rxchip signal. To deal with this, the apparatus modifies the value of the edgepos signal so that, if the frequency of the clk signal is slightly higher than the chip rate of the rxchip signal, the estimated position of the chip edge as defined by the edgepos signal moves in one direction through the set current_picked_samples and previous_picked_samples, and if the frequency of the clk signal is slightly lower than the chip rate of the rxchip signal, the estimated position of the chip edge as defined by the edgepos signal moves in the opposite direction through the set current_picked_samples and previous_picked_samples. As will be described in more detail below, if and when the estimated position of the chip edge approaches one end of the set current_picked_samples and previous_picked_samples, it is jumped to the other end, and two samples, instead of one, are output; and if and when the estimated position of the chip edge approaches the other end of the set current_picked_samples and previous_picked_samples, it is jumped to the first end, and no sample, instead of one, is output.

Figure 2:
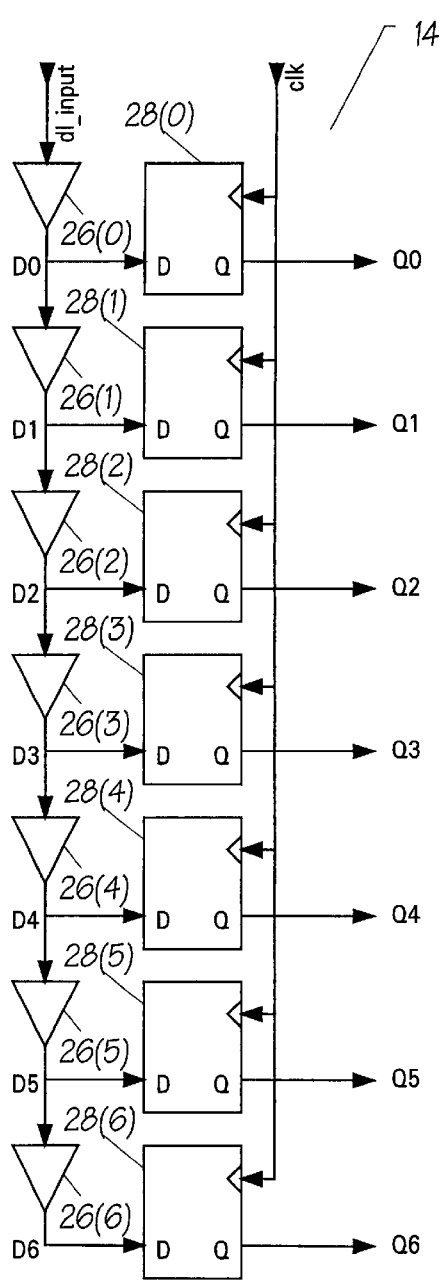
FIG. 2 is a circuit diagram of a sampled delay line forming part of the apparatus of FIG. 1.

Having provided an overview of the apparatus, the delay line circuit 14 will now be described in more detail with reference to FIGS. 2 and 3.

The dl_input signal is fed to the delay line circuit 14 formed by a series of gates 26(0)–(6), typically non-inverting buffers. Only seven gates 26(0–6) are shown in FIG. 2 for simplicity; in practice more would probably be provided. Taps are taken from the outputs of the gates 26(0)–(6) to provide signals D0—D6 respectively, which are supplied as the data inputs to a series of flip-flops 28(0)–(6) which are clocked by the clk signal. The outputs Q0–Q6 from the flip-flops 28(0)–(6) form the oversamples signal. It will be appreciated that, if the delay per gate 26(0)–(6) is $T_g$, then the nth flip-flop 26(n−1) will contain a sample of rxchip at time $t-n.T_g$, where t is the current time.

In the calibration mode described above, the clk signal produces a characteristic pattern in the oversamples signal from which the calibration control circuit 16 can produce the estimate ffs_per_cycle of the period of the clk signal divided by the delay $T_g$ per gate 26(0)–(6). For instance, if an example of the oversamples signal is (Q0, . . . , Q6)=(0, 0,0,1,1,1,0), then ffs_per_cycle is estimated as 6. The delay line circuit 14 must have sufficient stages to provide a sufficient number of samples under slowest gate conditions and to cover a whole chip period under fastest gate conditions. For example, in a process where the delay $T_g$ per gate 26(0)–(6) can vary by a factor of four as a fraction of process, time, voltage and temperature, and at least six oversamples are required within the chip, then the delay line circuit 14 needs to have at least 6×4=24 gates.

Figure 3:
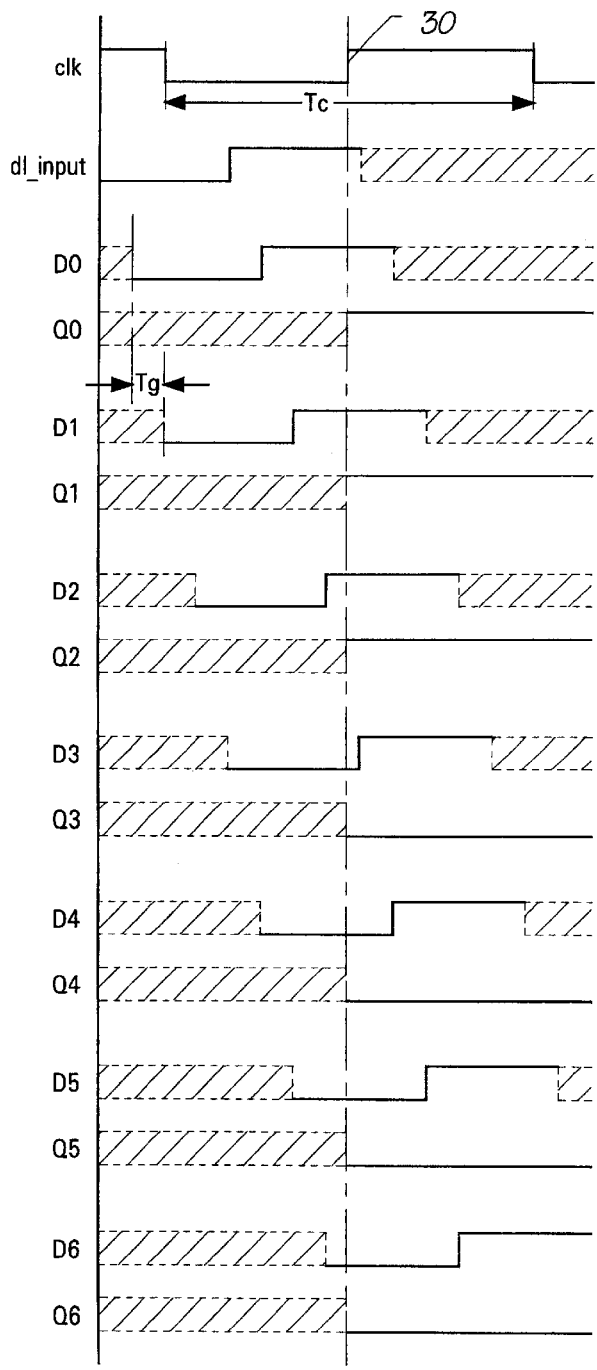
FIG. 3 is a timing diagram to assist in an understanding of the operation of the sampled delay line of FIG. 2.

FIG. 3 is a timing diagram for the delay line circuit 14 when operating in the decoding mode. The clk signal of period $T_c$ is shown in the top section of the drawing. The flip-flops 28(0)–(6) latch on the rising edge 30 of the clk signal. The next section of FIG. 3 shows in continuous line a portion of the dl_input signal. The remaining sections of FIG. 3 show in pairs the input signals D0—D6 to, and corresponding output signals Q0—Q6 from, the flip-flops 28(0)–(6). As can be seen, each signal Dn from a particular gate 26(n) is delayed by $T_g$ with respect to the signal D(n−1) from the preceding gate 26(n−1) in the delay line circuit 14. It can also be seen that, in the example given, an over-samples signal of (Q0, . . . , Q6)=(1,1,1,0,0,0,0) is produced.

As mentioned above, with each cycle of the clk signal, the phase pick circuit 18 selects a predetermined number of samples (picked_samples) of the oversamples signal spread as regularly as possible over the first ffs_per_cycle samples, beginning with the least delayed sample. For example, suppose that the required number of samples in picked_samples is six (the samples being referred to as P0, . . . , P5), and suppose that the current value of ffs_per_cycle is seven. In this case, the phase pick circuit 18 would choose (P0,P1,P2,P3,P4,P5)=(Q0,Q1,Q2,Q4,Q5, Q6), i.e. omitting Q3 and, if available, Q7 and any higher numbered sample in oversamples. More generally for the case where the predetermined number of samples in picked_samples is six, the selection of the samples in oversamples for various values of ffs_per_cycle may be as given in the following table.

Mapping of oversamples onto picked_samples for various ffs_per_cycle, where number of samples in picked_samples equals six.

| | ffs_per_cycle | | | | | | | | | | |
|---|---|---|---|---|---|---|---|---|---|---|---|
| | 6 | 7 | 8 | 9 | 10 | 11 | 12 | 13 | 14 | 15 | 16 |
| P0 = | Q0 | Q0 | Q0 | Q0 | Q0 | Q0 | Q0 | Q0 | Q0 | Q0 | Q0 |
| P1 = | Q1 | Q1 | Q1 | Q2 | Q2 | Q2 | Q2 | Q2 | Q3 | Q3 | Q3 |
| P2 = | Q2 | Q2 | Q3 | Q3 | Q4 | Q4 | Q4 | Q5 | Q5 | Q6 | Q6 |
| P3 = | Q3 | Q4 | Q4 | Q5 | Q5 | Q6 | Q7 | Q7 | Q8 | Q8 | Q9 |
| P4 = | Q4 | Q5 | Q6 | Q6 | Q7 | Q8 | Q9 | Q10 | Q10 | Q11 | Q12 |
| P5 = | Q5 | Q6 | Q7 | Q8 | Q9 | Q10 | Q11 | Q12 | Q13 | Q14 | Q15 |

It will be appreciated that the phase pick circuit 18 may be implemented by an array of logic gates or in other ways.

Figure 4:
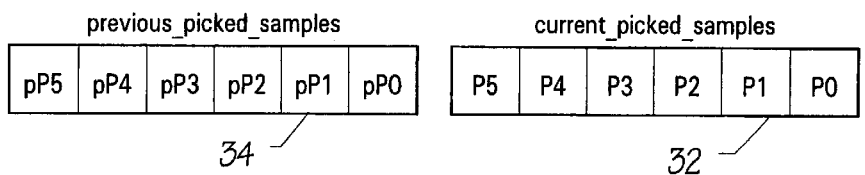
FIG. 4 illustrates two sets of registers for storing samples in the apparatus of FIG. 1.
Figure 5A:
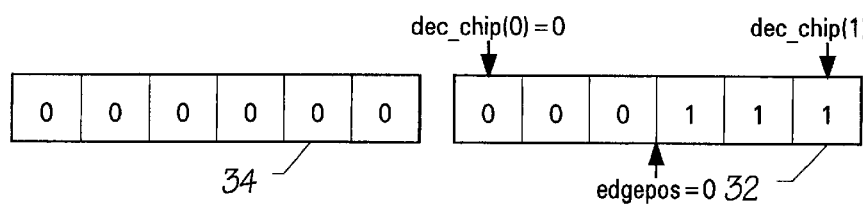
FIGS. 5a–f show examples of the contents of the registers of FIG. 4.
Figure 5B:
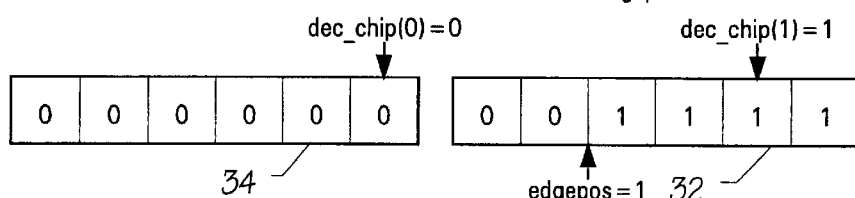
Figure 5C:
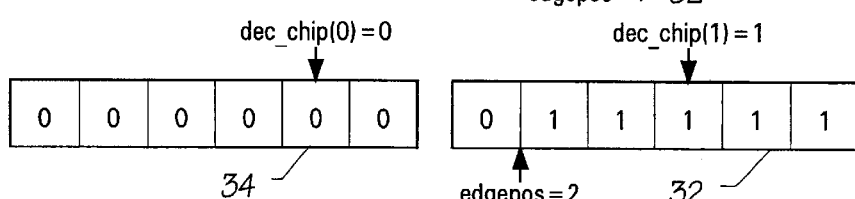
Figure 5D:
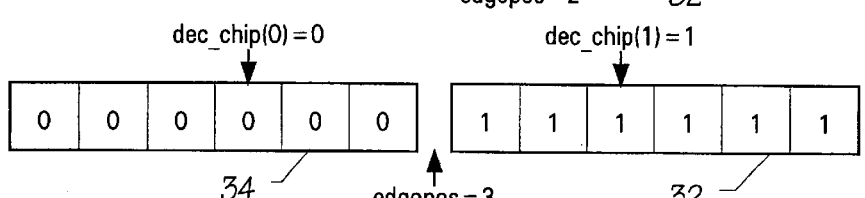
Figure 5E:
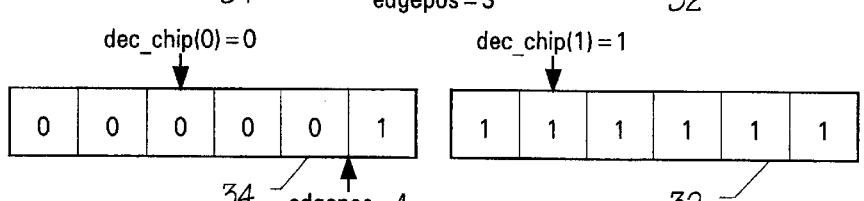
Figure 5F:
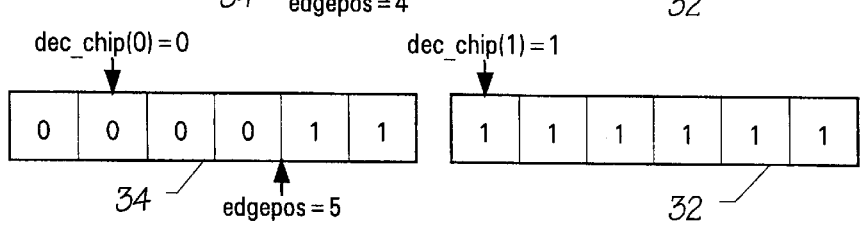

As mentioned above, the selected samples in picked_samples are passed with each cycle of the clk signal to the edge extract circuit 20, which stores the received signal as current_picked_samples, in a register 32 as shown in FIG. 4, and also stores the immediately preceding signal as previous_picked_samples (containing samples pP0, . . . , pP5) in a register 34. As also mentioned above, the edge extract circuit 20 receives an edgepos signal from the edge position circuit 22. The edgepos signal can take the same number of values as the number of samples in picked₁₃ samples, i.e. six in the example given such as 0≦edgepos≦5. The various positions in the registers 32,34 which the edgepos signal is taken to point to for each of its values 0, . . . , 5 are shown in FIGS. 5a–f, respectively, i.e. from between the registers containing samples P2,P3 to between the registers containing the samples pP1,pP2. As also mentioned above, with each cycle of the clk signal, the edge extract circuit 20 outputs two of the samples dec_chip(0), dec_chip(1) which are equally spaced by a predetermined amount to either side of the edgepos position. These two samples dec_chip(0), dec_chip(1) are marked in FIGS. 5a–f, and, as can be seen, for each value of edgepos, the samples dec_chip(0), dec_chip(1) and the position of edgepos are as given in the following table:

| | edgepos points to | | | |
|---|---|---|---|---|
| edgepos | between | and | dec_chip(0) | dec_chip(1) |
| 0 | P2 | P3 | P5 | P0 |
| 1 | P3 | P4 | pP0 | P1 |
| 2 | P4 | P5 | pP1 | P2 |
| 3 | P5 | pP0 | pP2 | P3 |
| 4 | pP0 | pP1 | pP3 | P4 |
| 5 | pP1 | pP2 | pP4 | P5 |

FIGS. 5a–f show examples of the samples P0–P5, pP0–pP5 of the chip stream with edgepos being correctly aligned with a chip edge in the chipstream. With each cycle of the clk signal, the edge extract circuit 20 determines whether edgepos appears to have drifted from such a chip edge. For example, if the two samples to the left and the two samples to the right of edgepos are (reading from left to right) 1,0,0,0 or 0,1,1,1, then edgepos needs to be increased, and this is indicated to the edge position circuit 22 by the up_or_down signal. On the other hand, if the two samples to the left and the right of edgepos are 1,1,1,0 or 0,0,0,1, then edgepos needs to be decreased, and this is indicated to the edge position circuit 22 by the up_or_down signal. If, however, the two samples to the left and the right of edgepos are 1,1,0,0 or 0,0,1,1, this indicates that edgepos is correctly positioned. If the two samples to the left and the right of edgepos are 0,0,0,0, it is taken that it is not possible to determine whether edgepos is correctly positioned. If the two samples to the left and the right of edgepos are 1,1,1,1, the third sample to the left is tested. If it is 1., it is taken that it not possible to determine whether edgepos is correctly positioned, and no attempt is made to change edgepos. If, however, it is zero, an indication that edgepos needs to be increased is given to the edge position circuit 22 by the up_or_down signal. This latter feature assists in locking edgepos onto the chip edge during a preamble at the beginning of reception, when edgepos is initially given an arbitrary value such as zero. As described above, four samples are normally used to assess the correctness of edgepos, but other numbers of samples, for example six samples could normally be used. It will be appreciated that the edge extract circuit 20 may be implemented by an array of logic gates or in other ways.

As mentioned above, the edge position circuit 22 receives the up_or_down signal and produces the edgepos signal and the n_dec_chips signal. In determining whether to change the edgepos signal, the edge position circuit 22 may be arranged to respond, if appropriate, to each up_or_down signal independently for each cycle of the clk signal, or it may be arranged, for example, to average the up_or_down signals for two or more successive cycles of the clk signal. In most cases, the n_dec_chips signal produced by the edge position circuit 22 indicates that only one of the samples dec_chip(0), dec_chip(1) output by the edge extract circuit 20 is to be used by the rebuild circuit 24, for example dec_chip(0). Provided that the value of edgepos does not change, or it is incremented or decremented by one between its minimum and maximum values (0 and 5 in the example), the value of n_dec_chips does not change. However, there are two cases where this is not the case, as will now be described with reference to FIGS. 6a–c and FIGS. 7a,b, respectively.

Figure 6A:
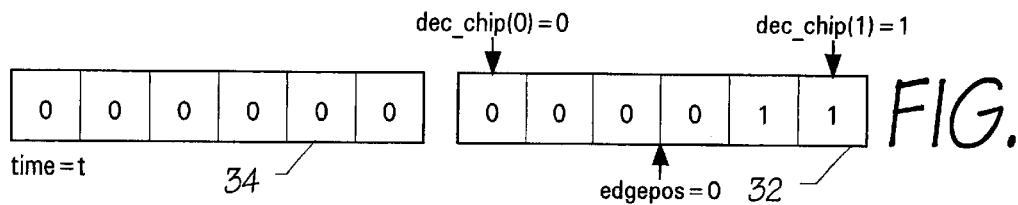
FIGS. 6a–c show examples of the contents of the registers of FIG. 4 when an edgepos pointer jumps from one extreme to another in one direction.
Figure 6B:
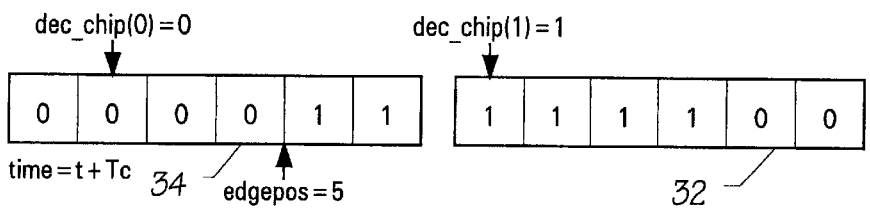
Figure 6C:
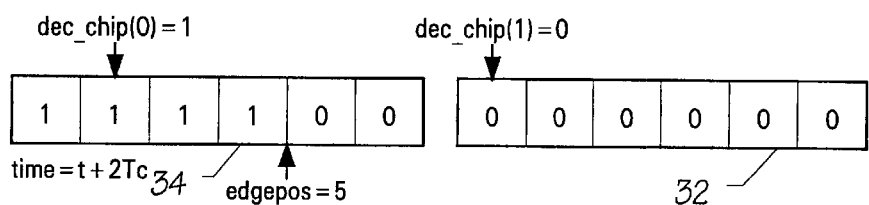

Referring to FIGS. 6a–c, as edgepos is moved later and later in time (to the right in the drawings), there comes to be a time when the expected position of the edge moves to a time later than that indicated by edgepos=0, as shown in FIG. 6a at time t. In this case, n_dec_chips is set so that neither dec_chip(0) nor dec_chip(1) is used. At the next cycle of the clk signal at time t+$T_c$, edgepos is set to 5, and the dec_chip(0) sample is used. Accordingly, with the values of the samples shown in FIGS. 6a–c, the output obtained is:

At time t, no output sample.
At time t+$T_c$, edgepos changed from 0 to 5; output sample dec_chip(0)=0.
At time t+2$T_c$, edgepos remains as 5; output sample dec_chip(0)=1.
Combined output for t to t+2$T_c$: 0, 1.

Figure 7A:
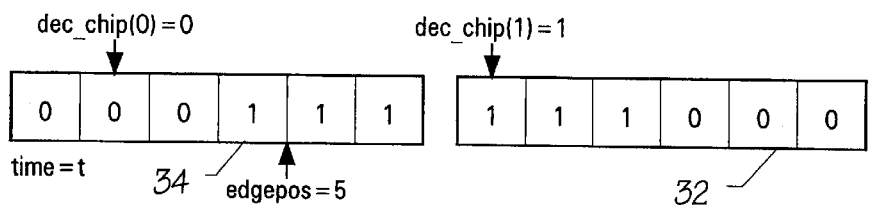
FIGS. 7a,b show examples of the contents of the registers of FIG. 4 when the edgepos pointer jumps from one extreme to another in the opposite direction.
Figure 7B:
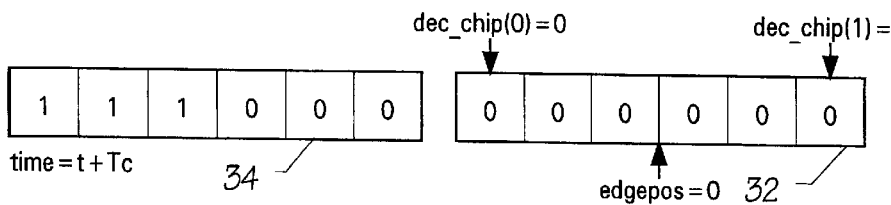

By contrast, referring to FIGS. 7a,b, as edgepos is moved earlier and earlier in time (to the left in the drawings), there comes to be a time when the expected position of the edge moves to a time earlier than that indicated by edgepos=5, as shown in FIG. 7a at time t. In this case, n_dec_chips is set so that both dec_chip(0) and dec_chip(1) are used. At the next cycle of the clk signal at time t+$T_c$, edgepos is set to 0, and the dec_chip(0) sample is used. Accordingly, with the values of the samples shown in FIGS. 7a,b, the output obtained is:

At time t, output samples dec_chip(0)=0 and dec_chip(1)=1.
At time t+$T_c$, edgepos changed from 5 to 0; output sample dec_chip(0)=0.
Combined output for t to t+$T_c$: 0, 1, 0.

It will be appreciated that the edge position circuit 22 and rebuild circuit 24 may be implemented by an array of logic gates or in other ways.

It should be noted that the embodiment of the invention has been described above purely by way of example and that many modifications and developments may be made to the described embodiment within the scope of the invention.

For example, in the embodiment described above, the edge extract circuit uses current_picked_samples and previous_picked_samples. Alternatively, the delay-line circuit 14 could include twice as many stages, and the phase pick circuit 18 could pick twice as many samples spread over the first 2×ffs_per_cycle samples, so that, in the example given, the number of samples in picked_samples would be twelve.

What is claimed is:

1. A method of decoding a stream of data which has been encoded into a chip stream so that a chip rate and phase of the chip stream can be derived from the encoded data, the method comprising decoding steps of:

generating a clock signal having a clock rate which is approximately equal to the chip rate or an integer multiple thereof;

passing the chip stream along a multi-stage delay line;

for each clock cycle, sampling data of the chip stream at a plurality of the stages of the delay line to produce a set of oversamples;

for each clock cycle, producing an estimate of a position in a respective set of the oversamples of a chip edge in the chip stream;

for at least some of the clock cycles, selecting at least one of the oversamples having a predetermined position with respect to the estimated chip edge position; and outputting the selected oversamples.

2. A method as claimed in claim 1, wherein the clock rate is fixed.

3. A method as claimed in claim 1, wherein the delay per stage of the delay line is unstabilised.

4. A method as claimed in claim 1, further including calibration steps comprising:

passing a signal having a known period into the delay line;

sampling data of the known period signal at a plurality of stages of the delay line to produce a set of calibration oversamples;

estimating from the sampled data an indication of the delay per stage of the delay line; and storing the delay per stage indication.

5. A method as claimed in claim 4, wherein the signal of known period is the clock signal.

6. A method as claimed in claim 4, wherein the calibration steps are performed intermittently while the decoding steps are not being performed.

7. A method as claimed in claim 4, wherein, in the decoding steps, the step of selecting at least one of the oversamples comprises the steps of:

for each clock cycle, making a first selection of some of the oversamples in dependence upon the stored delay indication;

for at least some of the clock cycles, making a second selection, from the first selection of the oversamples, of said at least one of the oversamples having a predetermined position with respect to the estimated chip edge position.

8. A method as claimed in claim 1, wherein, in the decoding steps, the step of producing the chip edge position estimate comprises the steps of:

storing a prior chip edge position estimate;

for at least some of the clock cycles, detecting any deviation of the chip edge position from the stored chip edge position estimate; and in response to such a detected deviation, adjusting the stored chip edge position estimate.

9. A method as claimed in claim 8, wherein:

the stored chip edge position estimate has a predetermined range of values;

if, for a clock cycle, the value of the stored chip edge position estimate needs to be adjusted beyond its range, it is instead adjusted to the other end of its range and none of the oversamples is selected for output; and if, for a clock cycle, the value of the stored chip edge position estimate needs to be adjusted past said other end of its range, it is instead adjusted to said one end of its range and two of the oversamples are selected for output.

10. An apparatus for decoding a stream of data which has been encoded into a chip stream so that a chip rate and phase of the chip stream can be derived from the encoded data, the apparatus comprising:

a clock for generating a clock signal having a clock rate which is approximately equal to the chip rate or an integer multiple thereof;

a multi-stage delay line for receiving the chip stream;

means clocked by the clock signal for sampling data of the chip stream at each stage of the delay line to produce a set of oversamples;

means clocked by the clock signal for producing an estimate of a position in a respective set of the oversamples of a chip edge in the chip stream;

means responsive to the clock signal for selecting, for at least some of the clock cycles, at least one of the oversamples having a predetermined position with respect to the estimated chip edge position; and means for outputting the selected oversamples.

11. An apparatus for decoding a stream of data which has been encoded into a chip stream so that a chip rate and phase of the chip stream can be derived from the encoded data, the apparatus comprising:

a clock for generating a clock signal having a clock rate which is approximately equal to the chip rate or an integer multiple thereof;

a multi-stage delay line for receiving the chip stream;

a processor clocked by the clock signal for: (a) sampling data of the chip stream at each stage of the delay line to produce a set of oversamples, (b) producing an estimate of a position in a respective set of the oversamples of a chip edge in the chip stream, (c) selecting, for at least some of the clock cycles, at least one of the oversamples having a predetermined position with respect to the estimated chip edge position, and (d) outputting the selected oversamples.

* * * * *